(12) United States Patent
Fricano et al.

(10) Patent No.: US 11,652,828 B1
(45) Date of Patent: May 16, 2023

(54) SYSTEMS AND METHODS FOR AUTOMATED ANOMALOUS BEHAVIOR DETECTION AND RISK-SCORING INDIVIDUALS

(71) Applicant: Wells Fargo Bank, N.A., San Francisco, CA (US)

(72) Inventors: Daniel Fricano, San Francisco, CA (US); Peter A. Makohon, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 87 days.

(21) Appl. No.: 17/146,180

(22) Filed: Jan. 11, 2021

(51) Int. Cl.
*H04L 9/40* (2022.01)
*G06Q 10/06* (2012.01)
*G06Q 10/0639* (2023.01)

(52) U.S. Cl.
CPC ... *H04L 63/1416* (2013.01); *G06Q 10/06398* (2013.01); *H04L 63/1425* (2013.01); *H04L 63/1433* (2013.01)

(58) Field of Classification Search
CPC ............. H04L 63/1416; H04L 63/1425; H04L 63/1433; G06Q 10/06398
See application file for complete search history.

(56) References Cited

U.S. PATENT DOCUMENTS

| | | | |
|---|---|---|---|
| 8,800,034 B2* | 8/2014 | McHugh | G06F 21/577 726/22 |
| 9,641,544 B1* | 5/2017 | Treat | H04L 43/04 |
| 9,942,250 B2 | 4/2018 | Stiansen et al. | |
| 10,073,679 B2 | 9/2018 | Straub et al. | |
| 10,157,286 B2 | 12/2018 | Skipper et al. | |
| 10,282,702 B2 | 5/2019 | Paltenghe et al. | |
| 10,382,464 B2 | 8/2019 | Shulman et al. | |
| 10,681,052 B2 | 6/2020 | Wang et al. | |
| 2009/0254392 A1 | 10/2009 | Zander | |
| 2014/0129457 A1 | 5/2014 | Peeler | |
| 2016/0132806 A1 | 5/2016 | To et al. | |
| 2017/0264619 A1 | 9/2017 | Narayanaswamy et al. | |
| 2017/0308701 A1 | 10/2017 | Nandha Premnath et al. | |
| 2017/0323270 A1 | 11/2017 | Gibbs | |

(Continued)

*Primary Examiner* — Kambiz Zand
*Assistant Examiner* — Afaq Ali
(74) *Attorney, Agent, or Firm* — Foley & Lardner LLP

(57) ABSTRACT

Systems, methods, and apparatuses for anomalous user behavior detection and risk-scoring individuals are described. User activity data associated with a first computing device of a first user is received from an agentless monitoring data source different from the first computing device. The user activity data includes a user identifier. An active directory (AD) identifier and employee-related information from a human resources database are determined based on the user identifier. Based on the employee-related information and/or AD identifier, a probability of an adverse event is determined. When the probability of the adverse event exceeds a predetermined threshold, a logging agent is activated on the first computing device and additional user activity data is received from the logging agent. A user-interactive electronic notification comprising an indication of the probability of the adverse event, a subset of the user activity data, and the additional user activity data is generated and transmitted to a second computing device of a second user.

20 Claims, 4 Drawing Sheets

(56) References Cited

U.S. PATENT DOCUMENTS

| | | | |
|---|---|---|---|
| 2018/0005190 A1* | 1/2018 | Innes | G06Q 10/0639 |
| 2018/0054449 A1 | 2/2018 | Nandha Premnath et al. | |
| 2018/0218167 A1 | 8/2018 | Narayanaswamy et al. | |
| 2019/0058732 A1 | 2/2019 | Abderrahmen et al. | |
| 2019/0222560 A1 | 7/2019 | Ford et al. | |
| 2019/0332807 A1 | 10/2019 | Lafever et al. | |
| 2019/0354753 A1* | 11/2019 | Worrall | G09B 19/003 |
| 2020/0153855 A1 | 5/2020 | Kirti et al. | |
| 2020/0176095 A1 | 6/2020 | Ansari et al. | |
| 2020/0204572 A1 | 6/2020 | Jeyakumar et al. | |
| 2020/0213336 A1 | 7/2020 | Yu et al. | |
| 2020/0228562 A1* | 7/2020 | Jones | G06F 21/577 |
| 2021/0084063 A1* | 3/2021 | Triantafillos | H04L 63/1433 |
| 2021/0103808 A1* | 4/2021 | Armstrong | G06N 3/04 |
| 2022/0052856 A1* | 2/2022 | Oliver | H04L 63/123 |

\* cited by examiner

SYSTEMS AND METHODS FOR AUTOMATED ANOMALOUS BEHAVIOR DETECTION AND RISK-SCORING INDIVIDUALS

TECHNICAL FIELD

The present disclosure relates to systems and methods for automated anomalous behavior detection and risk-scoring individuals.

BACKGROUND

The term user entity behavioral analytics (UEBA) refers to one or more cybersecurity policies that take note of expected user behavior and attempt to identify outlier behavior. Some organizations use UEBA to detect policy violations, which can be described as deviations from expected user behavior. UEBA can be helpful in detecting insider threats, malware-infected infrastructure endpoints, and compromised user accounts. UEBA systems and processes typically do not include any computer-based actions that can be automatically taken based on the UEBA findings. Furthermore, UEBA systems may provide limited insight into user behavior because various facets of user data (e.g., user identification data, user account credentials, user job role data) are typically siloed across separate systems within organizational IT infrastructures. Accordingly, UEBA systems, which are based on detecting activity originating from user devices, typically do not account for extra risks associated with high-profile users (e.g., users with a large scope of responsibility and/or system power-users.) Furthermore, UEBA system administration may be a high-overhead activity because UEBA systems typically rely on the use of key-logger applications, which need to be deployed and maintained on the monitored user devices across the organization. Furthermore, UEBA systems are event-driven (that is, they collect data about user-related events on computing device contemporaneously with user activity) and require high computing system overhead to capture and process the streams of event-related data from various devices.

SUMMARY

At least one arrangement relates to a computing system configured to receive, via a data channel from an agentless monitoring data source, user activity data associated with a first computing device of a first user. Based on the user activity data, anomalous user activity is identified. A classifier associated with the anomalous user activity is determined. An active directory (AD) identifier of the first user is determined based on the user identifier. The AD identifier is cross-referenced to a human resources database comprising employee-related information. Based on the employee-related information, a probability of an adverse event is determined. The probability of an adverse event can be further determined based on the at least one of the infiltration characteristic and the flight characteristic. In some arrangements, if the probability exceeds a predetermined threshold, a device monitoring agent is activated on the first computing device. A user-interactive electronic notification is generated and includes an indication of the probability of the adverse event, the at least one of the infiltration characteristic and the flight characteristic, and a subset of the user activity data. The user-interactive electronic notification is transmitted to a second computing device of a second user.

At least one arrangement relates to a computer-executable method to receive, via a data channel from an agentless monitoring data source, user activity data associated with a first computing device of a first user. Based on the user activity data, anomalous user activity is identified. A classifier associated with the anomalous user activity is determined. An active directory (AD) identifier of the first user is determined based on the user identifier. The AD identifier is cross-referenced to a human resources database comprising employee-related information. Based on the employee-related information, a probability of an adverse event is determined. The probability of an adverse event can be further determined based on the at least one of the infiltration characteristic and the flight characteristic. In some arrangements, if the probability exceeds a predetermined threshold, a device monitoring agent is activated on the first computing device. A user-interactive electronic notification is generated and includes an indication of the probability of the adverse event, the at least one of the infiltration characteristic and the flight characteristic, and a subset of the user activity data. The user-interactive electronic notification is transmitted to a second computing device of a second user.

At least one arrangement relates to non-transitory computer-readable media containing instructions stored thereon that, when executed by a processor, cause a computing system to receive, via a data channel from an agentless monitoring data source, user activity data associated with a first computing device of a first user. Based on the user activity data, anomalous user activity is identified. A classifier associated with the anomalous user activity is determined. Based on the classifier, a policy violation is determined, the policy violation including at least one of an infiltration characteristic associated with an event indicative of data loss and a flight characteristic associated with an event indicative of a departure. A probability, of an adverse event is determined based on the at least one of the infiltration characteristic and the flight characteristic. In some arrangements, if the probability exceeds a predetermined threshold, a device monitoring agent is activated on the first computing device. A user-interactive electronic notification is generated and includes an indication of the probability of the adverse event, the at least one of the infiltration characteristic and the flight characteristic, and a subset of the user activity data. The user-interactive electronic notification is transmitted to a second computing device of a second user.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

Figure 1:
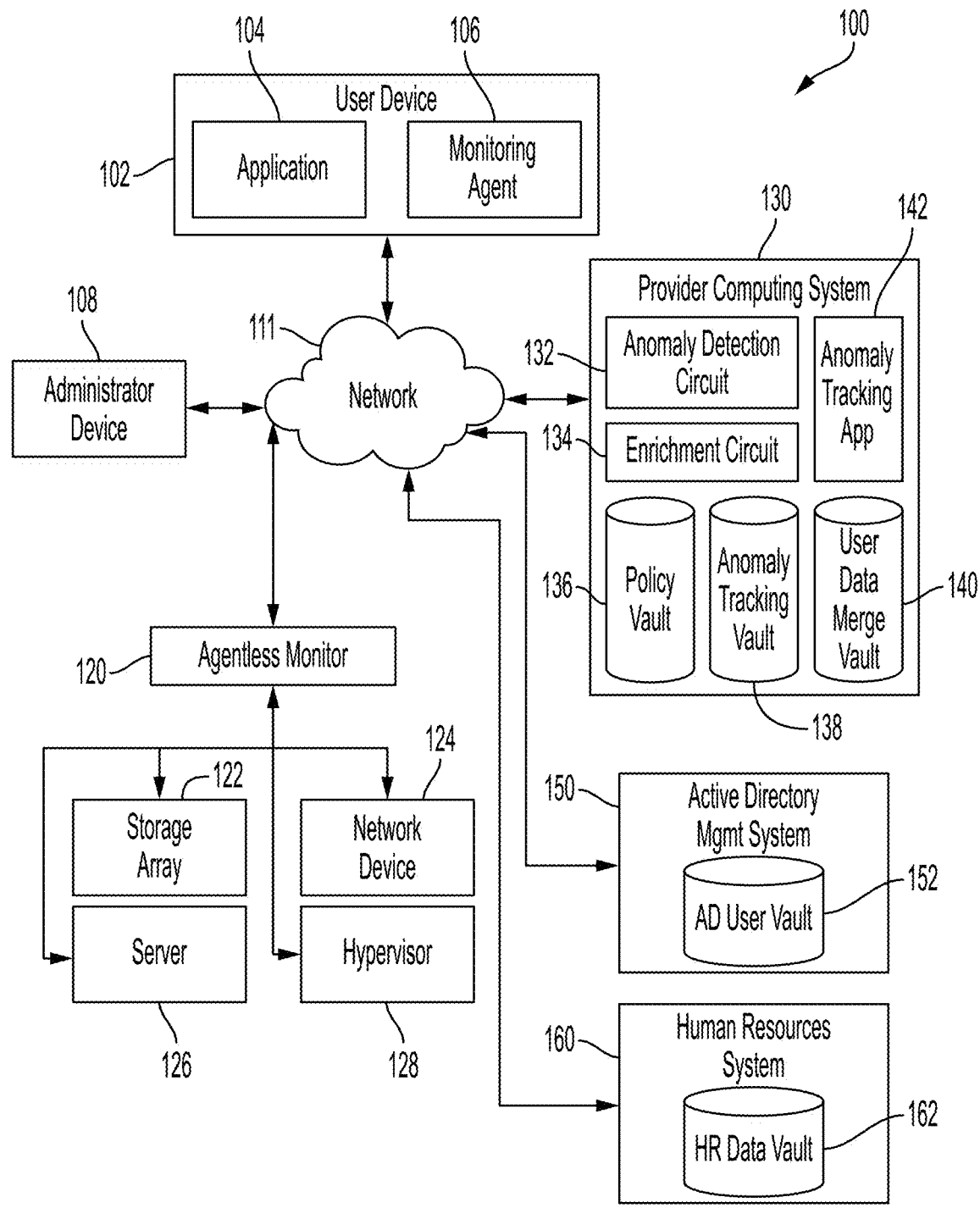
FIG. 1 is a component diagram of a computing system for anomalous behavior detection and risk-scoring individuals, according to an example arrangement.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Referring generally to the figures, systems and methods for automated anomalous user behavior detection and risk-scoring individuals are described. In operation according to an example arrangement, user activity data associated with a first computing device of a first user is received from an agentless monitoring data source different from the first computing device. The user activity data includes a user identifier. An active directory (AD) identifier and employee-related information from a human resources database are determined based on the user identifier. Based on the employee-related information and/or AD identifier, a probability of an adverse event is determined. When the probability of the adverse event exceeds a predetermined threshold, a logging agent is activated on the first computing device and additional user activity data is received from the logging agent. A user-interactive electronic notification comprising an indication of the probability of the adverse event, a subset of the user activity data, and the additional user activity data is generated and transmitted to a second computing device of a second user.

An aspect described herein relates to anomalous behavior detection and risk-scoring individuals based on a dual-tiered monitoring infrastructure. The dual-tiered monitoring infrastructure includes an agentless monitor for monitoring activity associated with a user device. The agentless monitor offloads certain monitoring activity from a particular user device, which makes the processor and memory resources of the user device available for other computer-based operations. The device-based monitoring agent is activated only when it is determined that additional monitoring is needed. The device-based monitoring agent can be automatically activated as part of a computer-based remediation plan. Technology in the field is improved by making UEBA less computing-intensive on the monitored devices.

An aspect described in the field relates to anomalous behavior detection and risk-scoring individuals based on merging device-related user activity data with active directory (AD) data and/or human resources data. Technology in the field is improved by improving the anomaly detection circuitry via the provision of a finely-tuned computer-based predictive impact model of user behavior. More specifically, as the active directory (AD) data and/or human resources data changes, the predictive impact model can self-adjust and accurately predict the impact of a policy violation based on the updated data.

Before turning to the figures, which illustrate certain example embodiments in detail, it should be understood that the present disclosure is not limited to the details or methodology set forth in the description or illustrated in the figures. It should also be understood that the terminology used herein is for the purpose of description only and should not be regarded as limiting.

Referring now to FIG. 1, component diagram of a computing system 100 for anomalous behavior detection and risk-scoring individuals, is shown, according to an example arrangement. The computing system 100 is structured to execute various computer-based operations for anomalous behavior detection and risk-scoring individuals, such as agentless monitoring of user data, receiving user activity data, parsing a user identifier from the user activity data, merging user activity data with active directory (AD) data, merging user activity data with human resources (HR) data, determining a policy violation associated with a particular user based on the merged user activity data, risk-scoring the user and/or determining a probability of an adverse event, activating a monitoring agent on the user device, and/or generating an administrator notification, which may include further remediation options. As defined herein, the term "policy violation" includes computer-based activity that is outside the bounds and/or threshold(s) of allowable computer-based activity as determined by an electronic policy record. Accordingly, the term "policy violation" may encompass organizational policy violations as well as abnormal user activity that does not yet rise to the level of an organizational policy violation but may be indicative of an increased probability of an organizational policy violation. Organizational policies encompass all suitable types of policies, including those addressing unauthorized data appropriation, cybersecurity, unauthorized use of computer systems, and employee departure.

As shown, the computing system 100 includes a user device 102, an administrator device 108, an agentless monitor 120, a storage array 122, a network device 124, a server 126, a hypervisor 128, a provider computing system 130, an active directory management system 150, and a human resources system 160. These components are communicatively coupled to one another via the network 111, which enables the components to electronically exchange data.

The user device 102 and/or administrator device 108 may be used by a user to perform various actions and/or access various types of data, some of which may be provided over the network 111. A "user" as referred to herein may refer to an individual operating one or more user devices 102 and interacting with resources or data via the user devices 102. An "administrator" as referred to herein may refer to an individual operating or administering, at least in part, any of the monitoring agent 106, the agentless monitor provider computing system 130, any of the storage array 122, network device 124, server 126 and hypervisor 128, the provider computing system 130, the active directory management system 150, and the human resources system 160. The user device 102 and/or administrator device 108 may be or include any suitable computing device, such as a desktop, a laptop, a tablet, or a smartphone. The user device 102 and/or administrator device 108 include a display and computer-executable instructions structured to provide to the user various graphical user interfaces (GUI). Further, the user device 102 and/or administrator device 108 have enabled location services which can be tracked over network 111. Location services may use a global positioning system (GPS) or other technologies. For example, the user device 102 and/or administrator device 108 can include a GPS sensor structured to determine and/or report the geographical coordinates of the device. The geographical coordinates of the device can be used to determine a geographical location of the device, including its country, region, city, etc. In some arrangements, the geographical location of the device can be determined based on an IP address determined from Internet traffic generated and/or routed by the user device 102 and/or administrator device 108 instead or in addition to using the information provided by the GPS sensor.

The user device 102 is shown to include an application 104. The application 104 can include computer-executable code (e.g., an .exe file). The computer-executable code may be deployed to the user device 102 or made executable, at least in part, on the user device 102. The application 104 can be a desktop application, a browser-based application, a cloud-based application, an application delivered via a virtualized environment, or any combination of the above. The application 104 can include GUI delivered via the display of the user device 102, through which the user can interact with the application 104 (e.g., select items, enter data, execute commands, transmit data, receive data, etc.) Further, the application 104 can be a user application or a utility application. For example, the application 104 can be a browser used by the user of the user device 102 to access various Internet resources. In another example, the application 104 can be designed to help to analyze, configure, optimize or maintain the user device 102 (e.g., antivirus software, disk space analyzer, a file compression utility, etc.) The application 104 can be communicatively coupled to any of the storage array 122, network device 124, server 126, and hypervisor 128. In some arrangements, the application 104 can be structured to retrievably store and/or access data on a storage media of the storage array 122. In some arrangements, the application 104 can be structured to route network traffic (e.g., packets) via the network device 124. In some arrangements, the application 104 can be structured to receive and/or transmit data and executable instructions to/from the server 126. In some arrangements, the application 104 can be structured to be delivered to the user device 102 via a virtual machine (e.g., the hypervisor 128, such as VMware). In some arrangements, the application 104 is a client application for the hypervisor 128.

The user device 102 is shown to include a monitoring agent 106. The monitoring agent 106 can include computer-executable code (e.g., an .exe file). The computer-executable code may be deployed to the user device 102 or made executable, at least in part, on the user device 102. In operation, the monitoring agent 106 can be structured to continuously or periodically (e.g., every 500 milliseconds, every second, every 5 seconds, every 30 seconds, every minute, etc.) monitor user activity on the user device 102. The user activity may include key strokes, live screen activity, Internet browsing activity, inbound data communications, outbound data communications, invocation of executable files on the user device 102, and so forth. In some arrangements, the monitoring agent 106 is structured to record and/or live stream (e.g., to the administrator device 108) various user activity data, such as GUI activity (e.g., of the application 104), a camera feed from the user device 102, and/or keystroke activity on the user device 102. In some arrangements, the monitoring agent 106 has a counterpart application deployed to the administrator device 108 or the provider computing system 130, which may be structured to allow an administrator user or an executable process of the provider computing system 130 to remotely restart the user device 102, shut down the user device 102, send a push notification to the user device 102, and configure the monitoring parameters of the monitoring agent 106 (e.g., enable or disable features, configure monitoring frequency). In some arrangements, the monitoring agent 106 is disabled by default. The monitoring agent 106 can be enabled by the anomaly detection circuit 132 of the provider computing system 130 when the agentless monitor 120, described below, generates user activity data that allows the anomaly detection circuit 132 to determine that anomalous behavior is taking place. The dual-tiered monitoring infrastructure reduces unnecessary consumption of computing resources (e.g., memory and processing power of the user device 102, bandwidth of the network 111) unless a heightened level of user device monitoring is required.

In the course of executing computer-based operations, the user device 102 may interact (e.g., generate traffic to, route traffic to, receive traffic from, and/or save data on) any of the storage array 122, network device 124, server 126, and/or hypervisor 128. In some arrangements, these interactions can take place in the form of direct commands from the user device 102 (e.g., via an administrator interface for any of the storage array 122, network device 124, server 126, and/or hypervisor 128). In some arrangements, these interactions can include traffic generated or routed by the application 104. For example, the user can use a browser to access a particular Internet site by keying in a uniform resource locator (URL) address, download a file of a particular size, receive an electronic mail message from a particular email address, and/or attempt to change the proxy settings of the user device 102.

User activities generate traffic between the user device 102 any of the storage array 122, network device 124, server 126, and/or hypervisor 128. The storage array 122 (e.g., a disk array) can be structured to form a data storage system that includes non-transitory media for retrievably storing data. The storage array 122 can include one or more communicatively coupled components, such as hard disk drives (MD), solid-state drives (SSD), memory, processor, control circuitry, and management circuitry. The network device 124 can include hardware, software, or a combination thereof structured to manage traffic and aid in the operation of the network 111. Some examples of network devices 124 can include switches, routers, hubs, bridges, gateways, repeaters, and access points. The server 126 can include hardware, software, or a combination thereof structured to provide functionality for various client devices and applications. Some examples of servers 126 include mail servers, file servers, database servers, and web servers. The hypervisor 128 can include hardware, memory and circuitry having computer-executable code thereon that creates and runs a virtual (host) machine. In some arrangements, the hypervisor 128 can include a hardware platform that hosts multiple virtualized operating system instances for multiple, different user devices 102. Each guest device (user device 102) can have executing thereon a separate operating system instance as well as separate instances of the application 104 and/or monitoring agent 106. The hypervisor 128 can include control circuitry that assigns resources, such as user space, processing resources, and memory resources, to each separate operating system instance created for a particular user device 102. Each user device 102 can have a client application running thereon, which can be structured to deliver to the user device 102 various virtualized resource described herein.

The agentless monitor 120 can include hardware (e.g., non-transitory memory, processor, and/or circuitry) that is structured to run computer-executable code that monitors user activity data pertaining to various entities within the computing system 100, such as the storage array 122, network device 124, server 126, and/or hypervisor 128. In some arrangements, the agentless monitor 120 is structured to receive (e.g., intercept) and parse electronic messages transmitted between any of these components and the user device 102 without installing any monitoring applications on the user device 102.

For instance, in some arrangements, the server 126 is a monitored gateway server and network traffic from the user device 102 is routed to the network devices 124 via the server 126, The agentless monitor 120 can be structured to parse user activity data from the packets of traffic routed via the server 126. The user activity data can include any header, footer, payload, or metadata properties of the relevant packets. In some arrangements, the agentless monitor 120 receives and parses user activity data from logs generated by any of the storage array 122, network device 124, server 126, and/or hypervisor 128. Each log may include a string that relates to a particular instance of user activity. The agentless monitor 120 can parse out a user identifier, executable name, executable file path, timestamp, bytes in, bytes out and other relevant properties from the string indicative of user activity. In some arrangements, the application 104 executed via the user device 102 includes instrumentation (e.g., JavaScript code for browser-based functionality) that is structured to track various aspects of user experience and transmit that information to the agentless monitor 120, which may parse out the relevant details, such as particular functionality (path, executable and/or parameters) invoked by the user within the application, error messages received, file names and source information of received and/or uploaded files, etc. In some arrangements, the agentless monitor can monitor the storage array 122, network device 124, server 126, and/or hypervisor 128 in addition to agentlessly monitoring the user device 102.

The provider computing system 130 is shown to include an anomaly detection circuit 132, an enrichment circuit 134, a policy vault 136, an anomaly tracking vault 138, a user data merge vault 140, and an anomaly tracking application 142. The provider computing system 130 is structured to perform various computer-executable operations related to anomalous behavior detection and risk-scoring individuals. In some arrangements, user activity data regarding a computing device 102 is received. A device and/or user identifier is parsed from the data. The user's active directory credentials and/or human resources-related information, such as job role and seniority level, are determined based on the device and/or user identifier. A policy violation is determined based in part on the human resources-related information. The policy violation is scored. In some arrangements, based on the score, a probability of an adverse event is determined and the monitoring agent 106 may be activated on the user device 102, if it was previously inactive, to monitor additional aspects of user activity on device 102. In some arrangements, a notification is generated and provided to the administrator device 108. The notification may include a hyperlink to an electronic dashboard comprising information regarding policy violations on the user device 102. The hyperlink may be a unique hyperlink generated specifically for the dashboard pertaining to a particular user device 102. Generating the hyperlink may include generating a URL to a dashboard application hosted by a particular server 126 and concatenating the URL that designates the general path (file-system or domain-based) of the application with a device and/or user identifier parsed from the received user activity data such that a landing page specific to the monitored user is displayed.

Accordingly, in operation, the anomaly detection circuit 132 is structured to receive data from the agentless monitor 120, application 104 and/or the monitoring agent 106. The user activity data may pertain to the user device 102. In some arrangements, the user activity data may include, for example, log-in traffic information collected from any of the user device 102, application 104, hypervisor 128, server 126, etc. The log in traffic may include a timestamp, a user name, a source device path and/or unique identifier, a number of logic attempts, whether a log in attempt was successful, etc. In some arrangements, the server 126 is a monitored gateway server and the log-in traffic information accordingly may include log-in traffic information for various security-restricted Internet-based applications or websites accessed by a user of the user device 102. In some arrangements, user activity data may include identifying information (e.g., name, path, instance identifier) related to user attempts to install unauthorized software, and the anomaly detection circuit 132 may be structured to identify such attempts by performing a keyword search on the user activity data (e.g., by searching the user agent data element to determine whether a non-approved browser client application 104 is being used). In some arrangements, the user activity data may include further Internet activity, data, such as a website visited, time spent on website, etc. In some arrangements, user activity data may include data regarding local devices communicatively coupled to the user device 102 (e.g., via a USB port, via an port). In some arrangements, user activity data may include message size (e.g., expressed as a number of bytes-in for downloads and other inbound traffic and bytes-out for uploads and other outbound traffic.)

In some arrangements, user activity data includes a user identifier associated with the user of the user device 102. The anomaly detection circuit 132 is structured to parse the user identifier from the user activity data and cause the enrichment circuit 134 to cross-reference the user identifier to information retrievably stored in the active directory user vault 152 of the active directory management system 150. For example, the enrichment circuit 134 may generate a query comprising a user identifier parameter string and receive the query results from the active directory user vault 152. The query results may include various active directory information related to the user identifier parsed from the user activity data. The active directory, information may include user profile configuration information (e.g., profile path, login script, home folder path for roaming profiles), user information (e.g., name, organization, default location, email address), account information (e.g., user name, logon hours, allowable log-on servers, requirements for password changes), group membership information, access rights information for particular active directory objects (e.g., application 104, server 126), and/or session configuration settings (e.g., automatic log-out time window for inactive users).

In some arrangements, the enrichment circuit 134 is further structured to cross-reference the user identifier to information retrievably stored in the human resources data vault 162 of the human resources system 160. For example, the enrichment circuit 134 may generate a query comprising a user identifier parameter string and receive the query results from the human resources data vault 162. The query results may include various human resources information related to the user identifier parsed from the user activity data. The human resources information may include retrievably stored structured data (e.g., employee job role, description of duties, direct report information, total number of reports, seniority information) and unstructured data. In some arrangements, the unstructured data includes documents (e.g., text documents, PDF files, image files) and/or paths thereto. The documents may include historical performance review information for the employee identified by the user identifier parsed from the user activity data (e.g., comments, competency rating, performance rating, performance improvement plan information, etc.). In some arrangements, the enrichment circuit 134 includes an optical character recognition (OCR)-based parser structured to parse the historical review information from the documents.

The enrichment circuit 134 may be structured to retrievably store at least a subset of user activity data, enriched with active directory and/or human resources data, in the user data merge vault 140. The user data merge vault 140 can be structured to relationally link this information to a particular data set in the anomaly tracking vault 138. Data in the anomaly tracking vault 138 is also relationally linked to data in the policy vault 136. In operation, after causing the received user activity data to be enriched, the anomaly detection circuit 132 may cross-reference the retrievably stored enriched user activity data to policy data from the policy vault 136 to determine whether an anomaly (e.g., a policy violation) has occurred. Examples of policy data may include blacklisted or watch-listed websites (e.g., indeed.com or other job search websites), white-listed applications (where an application not included in the white list would be considered prohibited), and black-listed applications associated with particular alert severity levels.

The anomaly detection circuit 132 may determine, based on cross-referencing the enriched user activity data to the policy data, an identifier, description and severity level of the policy that has been violated. In some arrangements, the severity is based on a classifier, which may categorize user activity as abnormal, high-risk, or malicious. Examples of abnormal activity may include a new domain visited from the user device 102, a new (not previously, accessed) server 126 accessed, a new executable/binary file used, a new high-volume data transfer relative to a particular byte threshold and/or relative to the typical (e.g., daily average, weekly average) bytes-in or bytes-out size for a particular user or user device 102, Examples of high-risk activity may include an order-of-magnitude shift in bytes-out on a particular user device where a user devices previously transferring N bytes on a periodic basis has transferred 10N, 100N, etc. bytes in a particular time period (hour, day, week). As another example, active directory or human-resources related information may indicate that the user is highly exposed (e.g., has access to many production systems) or highly impactful (e.g., is a super-used, manages a high number of total reports), As another example, user activity data that the user's activity is not in compliance with the relevant regulatory requirements. As another example, high-risk activity may include detection of a accessing a new domain following a new binary and/or detection of a user location where a user is working internationally, Examples of malicious activity may include investigated and confirmed events.

Accordingly, the anomaly detection circuit 132 populates and updates the anomaly tracking vault 138, where information regarding identified policy violations is stored. The information in the anomaly tracking vault 138 may be periodically supplemented. In some arrangements, the information is supplemented by automatically collecting periodic user activity data via the agentless monitor 120. In some arrangements, the information is supplemented by automatically collecting additional data via the monitoring agent 106, which may be activated on a particular user device 102 when a first policy violation is detected, when a policy violation of a particular type is detected, when a predetermined number of policy violations is detected, etc.

Further regarding FIG. 1, the network 111 may include: a local area network (LAN), a wide area network (WAN), a telephone network, such as the Public Switched Telephone Network (PSTN), a wireless link, an intranet, the Internet, or combinations thereof. The network 111 can enable communication between various nodes. In some arrangements, data flows through the network 111 from a source node to a destination node as a flow of data packets, e.g., in the form of data packets in accordance with the Open Systems Interconnection (OSI) layers. A flow of packets may use, for example, an OSI layer-4 transport protocol such as the User Datagram Protocol (UDP), the Transmission Control Protocol (TCP), or the Stream Control Transmission Protocol (SCTP), transmitted via the network 111 layered over an OSI layer-3 network protocol such as Internet Protocol (IP), e.g., IPv4 or IPv6. The network 111 is composed of various network devices (nodes) communicatively linked to form one or more data communication paths between participating devices. Each networked device includes at least one network interface for receiving and/or transmitting data, typically as one or more data packets. An illustrative network 111 is the Internet; however, other networks may be used. The network 111 may be an autonomous system (AS), i.e., a network that is operated under a consistent unified routing policy (or at least appears to from outside the AS network) and is generally managed by a single administrative entity (e.g., a system operator, administrator, or administrative group).

The network Ill may be composed of multiple connected sub-networks or AS networks, which may meet at one or more of: an intervening network (a transit network), a dual-homed gateway node, a point of presence (POP), an Internet eXchange Point (IXP), and/or additional other network boundaries. The network 111 can be a local-area network (LAN) such as a company intranet, a metropolitan area network (MAN), a wide area network (WAN), an inter network such as the Internet; or a peer-to-peer network, e.g., an ad hoc Wi-Fi peer-to-peer network. The data links between nodes in the network 111 may be any combination of physical links (e.g., fiber optic, mesh, coaxial, twisted-pair such as Cat-5 or Cat-6, etc.) and/or wireless links (e.g., radio, satellite, microwave, etc.).

The network 111 can include carrier networks for mobile communication devices, e.g., networks implementing wireless communication protocols such as the Global System for Mobile Communications (GSM), Code Division Multiple Access (CDMA), Time Division Synchronous Code Division Multiple Access (TD-SCDMA), Long-Terni Evolution (LTE), or any other such protocol including so-called generation 3G 4G, 5G, and 6G protocols. The network 111 can include short-range wireless links, e.g., via Wi-Fi, BLUETOOTH, BLE, or ZIGBEE, sometimes referred to as a personal area network (PAN) or mesh network. The network 111 may be public, private, or a combination of public and private networks. The network 111 may be any type and/or form of data network and/or communication network.

The network 111 can include a network interface controller that can manage data exchanges with devices in the network 111 via a network interface (sometimes referred to as a network interface port). The network interface controller handles the physical and data link layers of the Open Systems Interconnection (OSI) model for network communication. In some arrangements, some of the network interface controller's tasks are handled by one or more processing circuits. In various arrangements, the network interface controller is incorporated into the one or more processing circuits, e.g., as circuitry on the same chip.

In some arrangements, the network interface controller supports wireless network connections and an interface is a wireless (e.g., radio) receiver/transmitter (e.g., for any of the IEEE 802.11 Wi-Fi protocols, near field communication (NFC), BLUETOOTH, BLUETOOTH LOW ENERGY (BLE), ZIGBEE, ANT, or any other wireless protocol). In various arrangements, the network interface controller implements one or more network protocols such as Ethernet.

Expanding generally on network traffic and packets, the various computing devices described herein can originate and/or transmit traffic via the network 111. The term "traffic" generally refers to data communications between the computing devices and systems shown in FIG. 1. For example, a user device may submit requests to access various resources (e.g., applications, webpages, services, operating system management-related executables, file system management-related executables, system configuration-related executables) on a host within the computing environment 100 of FIG. 1. In another example, a user device can generate and/or transmit device connectivity data. Further, in an example arrangement described herein, a first device is a user device and a second device is a production host, such as an application server, a mail server, etc. The flow of traffic via the network 111 is multi-directional such that, the first device may receive return traffic originated by the second device. The return traffic to the first device via the network 111 may include data responsive to user requests to access the resources on the respective computing system (e.g., on the second device).

Network traffic can be segmented into packets. Each packet is a formatted unit for the data and routing instructions carried via the network 111. As used herein, the term "packet" may refer to formatted units at various levels of the OSI networking and/or TCP/IP models, such that the terms "packet", "IP packet", "segment", "datagram", and "frame" may be used interchangeably. An example packet includes a header, a footer, and a payload. In some arrangements, packets may also include metadata, which may include routing information. For example, in some arrangements, packets may be routed via a software-defined networking switch, which may include in the packet further information (metadata) containing routing information for the software-defined networking environment. For example, in addition to a payload, application-layer and/or link-layer in an example packet, may contain a header and/or footer that may include a source address of the sending host (e.g., a user device), destination address of the target host, a source port, a destination port, a checksum or other error detection and correction information, packet priority, traffic class, and/or type of service (ToS), packet length, etc. In arrangements where the network 111 comprises one or more virtual local area networks (VLANs), such that, for example, the various computing devices are on different YLANs, the packet may also contain a \IAN identifier.

Figure 2:
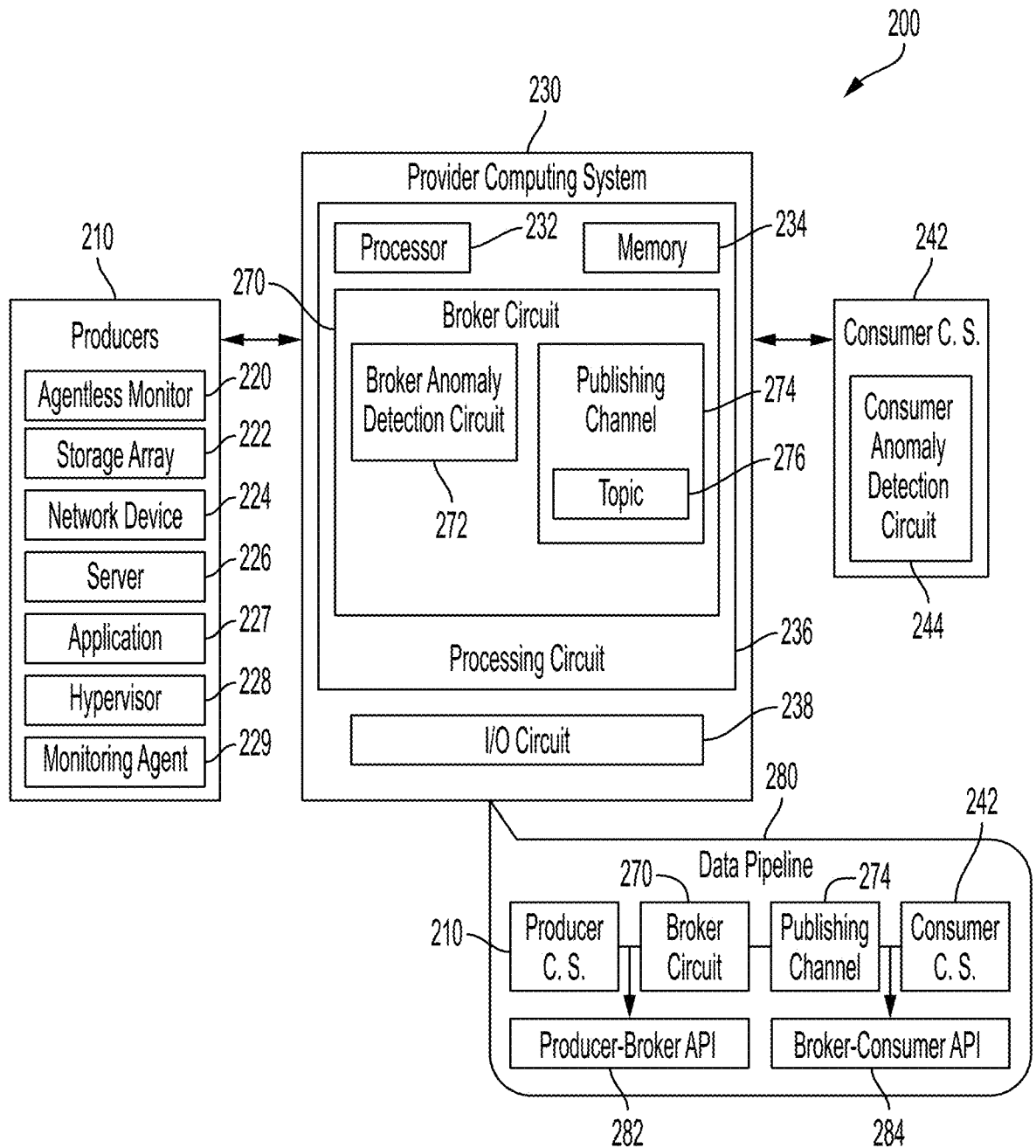
FIG. 2 is component diagram of a data pipeline of the computing system of FIG. 1, according to an example arrangement.

Referring now to FIG. 2, a component diagram of a computing system 200, including a data pipeline 280, is shown, according to an example arrangement. As shown, various components of the computing system 200 form a data pipeline 280. According to various arrangements, the data pipeline 280 enables agentless or agent-based monitoring of user devices by the producer computing device 210. More specifically, the data pipeline 280 can enable various entities (consumer computing devices 242, such as the administrator device 108 of FIG. 1) to engage in subscription-based user activity data dissemination, anomaly detection and risk-scoring. Generally, user activity data pertains to various user-driven events on monitored systems/devices and, accordingly, generating and transmitting user activity data via the data pipeline 280 is an event-driven process.

The data pipeline 280 is structured according to a producer-broker-consumer model for generating, transmitting and receiving user activity data. For example, the computer-executable operations enabled by the data pipeline 280 may include generating user activity data by the producer computing device 210, detecting anomalies in the user activity data by the broker circuit 270, publishing user activity data, enriched data, and/or anomaly information, by the broker circuit 270, to the publishing channel 274, and accessing the data, by the consumer computing device, via the publishing channel 274.

Accordingly, several latency-reducing and load balancing technical advantages emerge. For example, latency in electronic communications is reduced for both the outbound messages generated by the producer computing device 210 and the inbound messages received by the consumer computing device 242. The producer computing device 210 can asynchronously push monitored user activity data to the broker circuit 270 (rather than directly to the consumer computing device 242) via the producer-broker API 282. Accordingly, the producer computing device 210 does not need to wait for a receipt acknowledgement from a particular consumer computing device 242, which reduces latency. Furthermore, the load balancing is delegated to the broker circuit 270 such that the producer computing device does not need to use up processing power and memory resources (e.g., cache memory) to queue up and send out multiple message streams to different consumer computing devices 242. Further still, a particular consumer computing device 242 may need to preserve computing resources by eliminating the processing overhead associated with having its broker-consumer API 284 always on for receiving all event-driven user activity data. For example, an administrator of the particular consumer computing device 242 may wish to omit receiving data regarding certain users and/or receive data regarding particular high-risk users more frequently or as the user-driven monitored events occur. Accordingly, the consumer processing system can structure the broker-consumer API 284 to receive data in batches, on a predetermined schedule, and/or from particular topics 276 of the publishing channel 274, as described further herein.

As shown, the computing system 200 includes a producer computing device 210, a provider computing system 230, and a consumer computing device 242.

The producer computing device 210 can include hardware, software and/or circuitry that originates, generates and/or routes user activity data for a particular monitored device to the provider computing system 230, which then performs operations related to anomalous behavior detection and risk-scoring individuals and provides the output of these operations to one or more consumer computing devices 242. The producer computing device can include any of an agentless monitor 220, a storage array 222, a network device 224, a server 226, an application 227 (e.g., application 104 from the user device 102 of FIG. 1), a hypervisor 228, and/or a monitoring agent 229 (e.g., a device-based monitoring agent 106 from FIG. 1). In operation, these components operate substantially similar to their respective counterpart components described in relation to FIG. 1. The producer computing device 210 can provide streams of data (e.g., user activity data) to the provider computing system 230 through the producer-broker API 282.

The provider computing system 230 can include hardware, software and/or circuitry structured to perform computer-executable operations for anomalous behavior detection and risk-scoring individuals. As shown, the provider computing system 230 includes a processor 232, a memory 234, a processing circuit 236, and an input-output circuit 238. The processor 232 may be implemented as a general-purpose processor, an application specific integrated circuit (ASIC), one or more field programmable gate arrays (FPGAs), a digital signal processor (DSP), a group of processing components, or other suitable electronic processing components. The memory 234 may be or include tangible, non-transient volatile memory and/or non-volatile memory. The input-output circuit 238 is structured to receive communications from and provide communications to the user. The processing circuit 236 is structured to execute various computer-based operations stored in the memory 234.

As shown, the processing circuit 236 includes a broker circuit 270. The broker circuit 270 mediates the many-to-many relationship of producer computing devices 210 to consumer computing devices 242 via the publishing channel 270 structured to receive electronic messages and then stream these messages via topics 276.

In an example arrangement, the broker circuit 270 includes a broker anomaly detection circuit 272 and a publishing channel 274. The a broker circuit 270 receives data, via the producer-broker API 282, from one or more producer computing devices 210 and distributes data, via the broker-consumer API 284, to one or more consumer computing devices 242 (e.g., an administrator device 108 of FIG. 1). The producer-broker API 282 and/or the broker-consumer API 284 may include hardware infrastructure, memory and/or executables that embody a synchronous (e.g., event-based) or asynchronous (e.g., batch) interface engine between the respective systems. Although Apache Kafka and its XML- and Java-based APIs were used in an example embodiment, other suitable implementation infrastructures are also contemplated. In operation, the broker anomaly detection circuit 272 and/or the consumer anomaly detection circuit 244 are structured to perform operations substantially similar to those described with respect to their counterpart anomaly detection circuit 132 of FIG. 1. The computer-executable logic embodied by these circuits may be built into the broker circuit 270 and/or offloaded, at least in part, to the consumer computing device 242. Accordingly, in one example arrangement, the broker anomaly detection circuit 272 is structured to receive user activity data and perform operations substantially similar to those described with respect to its counterpart anomaly detection circuit 132 and enrichment circuit 134 of FIG. 1 and then publish the resulting data (e.g., user data merge results, anomaly tracking data) to the publishing channel 274, where it is accessible by one or more consumer computing devices 242. In another example arrangement, the publishing channel 274 is structured to receive data (e.g., unmerged user activity data) directly from the producer computing devices 210. In this scenario, one or more consumer computing devices 242 further perform operations for anomalous behavior detection and risk-scoring individuals, by the consumer anomaly detection circuit 244, on the raw user activity data received via the publishing channel 274.

Further in relation to the publishing channel 274, the publishing channel 274 can include hardware, circuitry, and/or storage media structured to receive and stream computer-based electronic messages. Accordingly, in some arrangements, the publishing channel 274 may include a data set or a queue of electronic messages. The electronic messages may represent event-based instances of user activity data. For example, when a user of a user device 102 accesses an Internet website, the access event may be captured as a user activity data message. The messages may be further organized into topics 276. In some arrangements, a topic 276 consolidates user activity data for a particular user device. In some arrangements, a topic 276 consolidates user activity data for a particular active directory user group. Other various arrangements and combinations thereof are contemplated (e.g., a topic 276 can refer to a particular user, a particular producer computing device 210, a particular anomaly, a particular policy identifier, and/or a particular policy category (anomalous event, high-risk event, malicious event, etc.) Accordingly, various consumer computing devices 242 can subscribe to particular topics 276.

Figure 3:
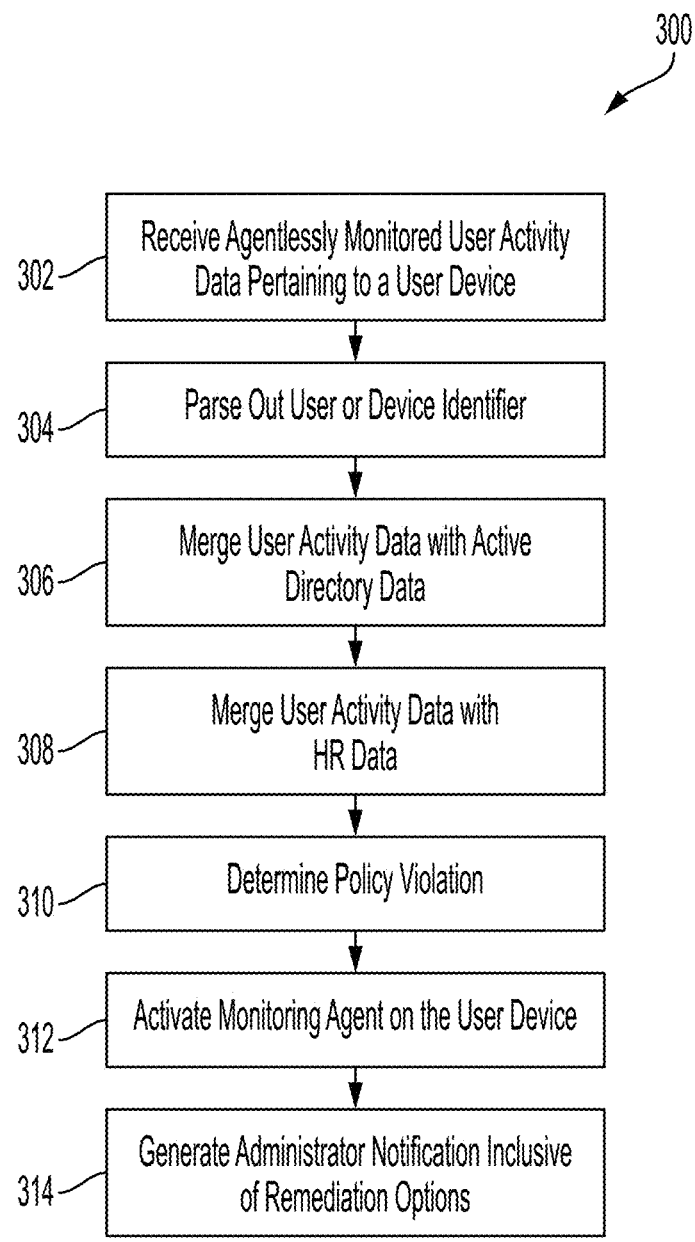
FIG. 3 is a flow diagram showing a computer-based method for anomalous behavior detection, the method executed by the computing system of FIG. 1 and/or FIG. 2, according to an example arrangement.

Referring now to FIG. 3, a flow diagram showing a computer-based method 300 for anomalous behavior detection is shown, according to an example arrangement. The method 300 can be executed by the provider computing system of FIG. 1 and/or FIG. 2, according to an example arrangement, and performs computer-based operations related to anomalous behavior detection and risk-scoring individuals. As a general overview, method 300 can include computer-executable operations to receive agentlessly monitored user activity data, parse a device and/or user identifier from the user activity data, determine the user's active directory credentials and/or human resources-related information, determine a policy violation, activate a monitoring agent on the user device, and generate an administrator notification.

As shown, at 302, method 300 includes computer-based operations to receive agentlessly monitored user activity data pertaining to a particular user device. In some arrangements, the user activity data is received by the provider computing system 130 of MG. 1 or a similar system. The user activity data can be received from an agentless monitor 120 of FIG. 1 or similar. Alternatively, the user activity data (e.g., in the form of logs, REST interface messages, etc.) can also be received from any of the various systems shown in FIG. 1, such as application 104, storage array 122, network device 124, server 126, and/or hypervisor 128. According to various arrangements, the user activity data can include a user device identifier, a user identifier, log-in traffic, identifying information related to attempts to install unauthorized software, Internet activity data, data regarding local devices communicatively coupled to the user device, size of electronic transmissions to and from the user device, etc. According to various arrangements, the user activity data is received without invoking any functionality on the user device itself such that the user device itself does not actively self-monitor to provide the user activity data. In some arrangements, various user activity data can be summarized, aggregated, etc., after being received.

As shown, at 304, method 300 includes computer-based operations to parse a device identifier and/or a user identifier from the received user activity data. For example, a user identifier may include, at least in part, user login credentials for the user device. For example, the user identifier may include a log-in domain and/or a log-in user name.

As shown, at 306, method 300 includes computer-based operations to merge the user activity data with active directory data. For example, the user identifier parsed from the received user activity data can be cross-referenced to an active directory user vault. The query results may include various active directory information related to the user identifier parsed from the user activity data. The active directory information may include user profile configuration information (e.g., profile path, login script, home folder path for roaming profiles), user information (e.g., name, organization, default location, email address), account information (e.g., user name, logon hours, allowable log-on servers, requirements for password changes), group membership information, access rights information for particular active directory objects, and/or session configuration settings. Accordingly, and more generally, computer system access permissions are determined based on the user identifier. In some arrangements, the user identifier is or includes, at least in part, an active directory user identifier.

As shown, at 308, method 300 includes computer-based operations to merge the user activity data and/or the computer system access permissions data with human resources-related data. For example, the system may generate a query comprising a user identifier parameter string and receive the query results from a human resources data vault. The query results may include various human resources information related to the user identifier parsed from the user activity data. In some arrangements, these operations are preceded by cross-referencing the user identifier parsed from the user activity data to another system which may store these identifiers relationally to HR-system specific employee identifiers generated for the employees. In this manner, employee system log-in information can be made devoid of any employee-identifying information (e.g., the employee number from the HR system) to preserve employee privacy. Additionally, if one of the HR system or active directory management system is replaced, there is no need to rebuild the entire data set that links system access permissions to employee scope-of-influence and performance-related standing information. In some arrangements, the system, rather than directly mapping the two identifiers, can apply a code generation executable (e.g., a hash algorithm not known to entities outside of the system) to generate an intermediary linking identifier. Accordingly, employee privacy can be further preserved by decomposing the resulting relational map into a first map comprising a user identifier-linking identifier data set and a second map comprising an employee identifier-linking identifier dataset. The first map can be stored, for example, on a system other than the HR data vault 162 of FIG. 1. The second map can be stored, for example, in the HR data vault 162 of FIG. 1.

The human resources information may include retrievably stored structured data (e.g., employee job role, description of duties, direct report information, total number of reports, seniority information) and unstructured data. In some arrangements, the unstructured data includes documents (e.g., text documents, PDF files, image files) and/or paths thereto. Accordingly, and more generally, the user's scope of influence and performance-based standing within an organization are determined based on the user identifier.

As shown, at 310, method 300 includes computer-based operations to determine a policy violation and/or risk-score an individual. One way to do so is described further in detail in reference to FIG. 4 herein, but other arrangements are also contemplated. In some arrangements, the computer-based operations include operations to identify anomalous user activity for example, by determining that a particular aspect of the user activity data triggers a policy violation from a policy definition file of the policy vault 136 of FIG. 1. This determination can be made by executing one or more computer-executable queries, procedures, etc., which are parametrized using various subsets of the user activity data, against various policy definition files in the policy vault 136, In some arrangements, to improve search speed by eliminating the need to search all policy definition files, the computer-based operations can include assigning a classifier to a particular subset of user activity data e.g., potential data loss, potential employee departure, potential malware instal-lation) based on the data content of the particular subset, and then searching a particular policy definition file that corresponds to the classifier (e.g., retrieve all policies related to potential job searches if the classifier is indicative of a potential job search and employee departure, as determined by Internet activity data, such as a website visited, time spent on website, etc.). In some arrangements, the computer-based operations also include, based on the classifier, determining at least one of an infiltration characteristic associated with an event indicative of data loss and a flight characteristic associated with an event indicative of a departure as described in relation to FIG. 4. The operations can also include determining a probability of an adverse event based at least on these characteristics as described in relation to FIG. 4. Generally, the probability of an adverse event can depend on the user's scope of influence and performance-based standing within the organization as determined based on the data merge operations with HR data at 308. More specifically, User A and User B may have identical policy violations but the impact of these violations may vary. User B may have recently had a negative performance review and may therefore be more likely to be a flight risk and/or to retaliate against the organization by, for example, downloading proprietary data for unauthorized use.

As shown, at 312, method 300 includes computer-based operations to activate a monitoring agent on the user device. According to various arrangements, the organization may, choose to monitor a particular user device more closely. This programmatically made determination may be based on any of the policy violation, classifier, infiltration characteristic, flight characteristic, and/or probability of adverse action for example, if these values meet or exceed a predetermined threshold. Accordingly, the computer-based operations may include determining whether a monitoring agent 106 on the user device 102 of FIG. 1 is in an active state or has been activated. The operations may include running an operating-system based process monitoring tool on the user device 102 and/or the hypervisor 128 to make this determination. The operations may include enabling the monitoring agent 106. In some arrangements, the operations may include configuring the monitoring agent 106 to monitor particular processes (e.g., key logger, Internet browsing activity, operating system process monitoring activity, etc.). In some arrangements, a log-off action may be forced on the user device 102. In some arrangements, a log-in script executable in the user's active directory profile can be set to start the monitoring agent 106 the next time the user logs into the user device 102. In some arrangements, the operations may include generating and transmitting a "deterrent" push notification to the user device 102 indicating that user activity is being monitored. In some arrangements, the operations may include generating and transmitting a push notification to the administrator device 108, which may have installed thereon an administrator portion of the monitoring agent 106. The notification may include, for example, a link to a screen activity monitoring tool, which may provide a direct feed from the user device 102 and/or may periodically take and transmit screen captures of the user device 102.

As shown, at 314, method 300 includes computer-based operations to provide an electronic dashboard to the administrator device 108 of FIG. 1. The dashboard may include any information collected or generated during execution of the method 300. In some arrangements, the policy vault 136 may further provide retrievably stored remediation options, which may also be displayed. The remediation options can include, for example, text-based messages with a call to action, such as to monitor, to remediate, to audit permissions and access for need, to provide user training, to review process controls, etc. In some arrangements, the remediation options can be automated such that, for example, the push notification to the user device may include a link to a training video related to a particular policy violation.

Figure 4:
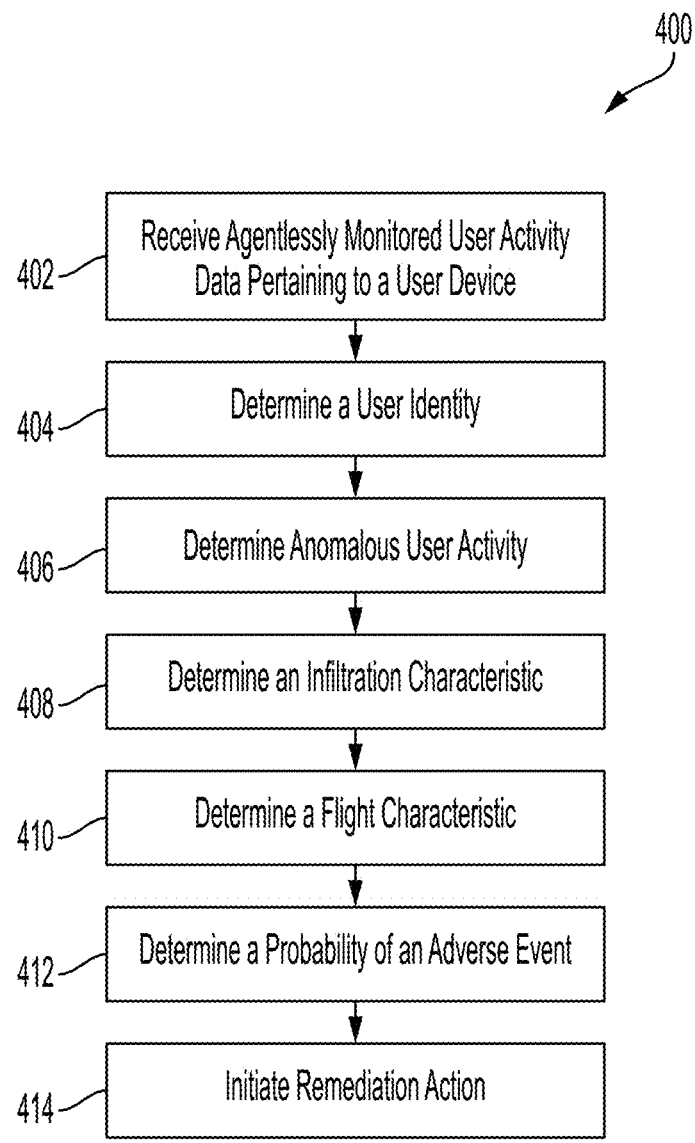
FIG. 4 is a flow diagram showing a computer-based method for risk-scoring individuals, the method executed by the computing system of FIG. 1 and/or FIG. 2, according to an example arrangement.

Referring now to FIG. 4, a flow diagram showing a computer-based method 400 for risk-scoring individuals is shown according to an example arrangement. The method 400 can be executed by the provider computing system of FIG. 1 and/or FIG. 2, according to an example arrangement, and performs computer-based operations related to risk-scoring individuals. As a general overview, method 400 can include computer-executable operations to receive agentlessly monitored user activity data, determine a user identity, determine anomalous user activity, determine an infiltration characteristic, determine a flight characteristic, determine a probability of an adverse event, and initiate remediation action.

As shown, at 402, method 400 includes computer-based operations to receive agentlessly monitored user activity data pertaining to a particular user device. In some arrangements, the user activity data is received by the provider computing system 130 of FIG. 1 or a similar system. Example operations are described in reference to 302 of FIG. 3.

As shown, at 404, method 400 includes computer-based operations to determine the identity of the user based on the user activity data. In some arrangements, these operations are performed by the provider computing system 130 of FIG. 1 or a similar system, Example operations are described in reference to 302-308 of FIG. 3. Accordingly, the operations at 404 include determining both system access permissions (by using, for example, active directory data) and employee scope-of-influence and performance-related standing (by using, for example, human resources-related data). Accordingly, at 406-410, the method 300 includes determining anomalous user activity, as indicated by a policy violation.

As shown, at 406, method 400 includes computer-based operations to determine anomalous user activity and/or a policy violation as described, for example, in reference to 310 of FIG. 3.

As shown, at 408, method 400 includes computer-based operations to determine an infiltration characteristic based at least in part on the user activity data, system access permissions, and the employee scope-of-influence and performance-related standing. The infiltration characteristic may be associated with an event indicative of data loss. In operation, as previously described, a classifier can be assigned to a particular subset of user activity data (e.g., potential data loss, potential employee departure, potential malware installation) based on the data content of the particular subset. A particular policy definition file that corresponds to the classifier can be searched to determine a policy violation. Further, the policy violation may be described by a policy violation record stored in the anomaly tracking vault 138 of FIG. 1. The policy violation record may have associated with it a data item indicative of an infiltration characteristic. The infiltration characteristic may be populated with data determined based at least in part on user activity data and policy data. For example, the infiltration characteristic, indicative of an actual or potential data loss, may include a timestamp, an executable path and/or name, executing device identifier, bytes out, the file path, name and/or extension of the file(s) transferred out, an indication of whether the transferred-out file(s) were deleted from the source system, etc. Additionally, the infiltration characteristic may be populated with a snippet of data from transferred-out file(s).

As shown, at 410, method 400 includes computer-based operations to determine a flight characteristic based at least in part on the user activity data, system access permissions, and the employee scope-of-influence and performance-related standing. The flight characteristic may be associated with an event indicative of a user departure. In operation, as previously described, a classifier can be assigned to a particular subset of user activity data (e.g., potential data loss, potential employee departure, potential malware installation) based on the data content of the particular subset. A particular policy definition file that corresponds to the classifier can be searched to determine a policy violation. Further, the policy violation may be described by a policy violation record stored in the anomaly tracking vault 138 of FIG. 1. The policy violation record may have associated with it a data item indicative of a flight characteristic. The flight characteristic may be populated with data determined based at least in part on user activity data and policy data. For example, the flight characteristic, indicative of imminent employee departure, may include a timestamp, an executable path and/or name (e.g., an Internet browser), executing device identifier, Internet activity data, such as a website visited, time spent on website, keyword search parameters used on a website (parsed from a URL string transmitted via a gateway server), etc. For example, visiting a job search website may be indicative of the user's imminent departure. In another example, searching for particular keywords using a search engine may be indicative of the user's imminent departure.

As shown, at 412, method 400 includes computer-based operations to determine a probability of an adverse event. To determine the probability of an adverse event, various predictive scoring techniques may be used. For example, in some arrangements, various data from the policy violation record, the infiltration characteristic data item, and the flight characteristic data item may be combined with user identity data to determine the probability of an adverse event. For example, the policy violation record may have a policy identifier associated with it, which links to a policy data store and allows for a determination, from the policy record, of a baseline level of risk (abnormal, high-risk, or malicious) associated with the user activity. In some arrangements, the baseline level of risk is the same for all users regardless of a user's individual employment-related data. As such, the method 400 may include using the employment-related data to adjust the baseline level of risk. For example, if the employment-related data indicates that an individual has a number of total reports that exceeds a particular threshold (e.g., 50 reports, 100 reports, etc.), the baseline level of risk associated with a flight characteristic may be adjusted from abnormal to high-risk, as it could be more difficult to replace a high-ranking employee on short notice. In another example, if an individual is determined to have super-user or administrator-level access to various systems, even if those systems are not affected by any anomalous user activity, the baseline level of risk may likewise be adjusted. In some arrangements, the baseline level of risk is a numerical score on a scale of 1-5, 1-10, 1-100, etc., where a higher score is indicative of a higher level of risk. Accordingly, the determined level of risk may be used as a basis for inferring the probability of an adverse event (e.g., data exfiltration, employee departure). In some arrangements, the probability is the determined level of risk. In some arrangements, determining the probability may involve further operations.

For example, in some arrangements, a current geographical location of the user device may be used to adjust the level of risk such that, for example, the probability of the adverse event increases if the user activity data indicates that activity (e.g., based on an IP address) is originated from a hostile country or from a location where the employee is not expected to be. In some arrangements, a particular policy violation is compared to previously recorded activity for a particular user and data related to the magnitude of the associated anomalous activity, clustering of anomalous activities, etc. may be used to adjust the probability.

In some arrangements, the level of risk may be supplemented by a user score. In some arrangements, the user score is a multi-variable user score (e.g., an array of more than one numerical scores, each numerical score corresponding to a particular dimension). In an example arrangement, the user score may include a user threat dimension, a user exposure dimension, and a user impact dimension. The average scores for these dimensions may be aggregated (averaged, weight-averaged, etc.) to determine the user score and/or level of risk.

The user threat dimension bay be based on activity occurring on the network, as determined from the user activity data and/or other supplemental data. As described herein, data for the user threat dimension can include alarms from controls, rule-based alerting, and detected deviations. In some arrangements, the user threat dimension may have a behavioral component (scored based on comparing an anomaly or policy violation to baseline or historical behavior for the user), a relative component (scored based on reviewing the relative behavior of users as they compare to their peers), and an action component (scored based on detecting policy violations as described above).

The user exposure dimension bay be based on determining whether a particular user is a target for attackers based on the user's placement in the organization, job in the organization, or actions taken to reduce the user's security posture. As described herein, data for the user exposure dimension can include employment-related data. In some arrangements, the user exposure dimension may have a business component (scored based on determining that a "perimeter" user, such as an employee in the C-suite, vendor relations, sales, and/or public relations, will have a higher level of exposure), a technical component (scored based on determining an amount of communication traffic for the user, such as email, social media activity, etc., and on whether the user's login credentials are determined to have been compromised), and an action component (scored based on detecting policy violations as described above, which would make the user more vulnerable to risk of adverse activity).

The user impact dimension bay be based on determining the scope of a potential adverse event (e.g., a cybersecurity attack, data loss, data exfiltration, departure) if the even were to occur. As described herein, data for the user impact dimension can include active directory and/or employment-related data. In some arrangements, the user impact dimension may have a business component (e.g., is the user a SWIFT user, a system administrator, a super user?; does the user have access to personally identifiable information of an organization's employees, contractors, and/or clients?), a permissions component (e.g., scored based on the number and identity of active directory groups that include the user, based on the number and identity of service accounts, based on the number and identity of privileged user accounts), and an access component (e.g., scored based on the number of stale accounts (e.g., not accessed by the user in the past 90 days or another time period), based on historical user activity data for the time period, etc.).

As shown, at 414, method 400 includes computer-based operations to initiate remediation action. In some implementations, initiating remediation actions includes generating a user activity dashboard. The user activity dashboard may include historical trends and/or current snapshots of user activity for a particular user or group of users. For example, the user activity dashboard may include a graphical representation of the level of risk, a user score, and/or a probability of an adverse event. The graphical representation can be generated utilizing any suitable graphing technique. In some arrangements, the graphical representation is or includes an alphanumeric value comprising the score. In some arrangements, the graphical representation includes an image, such as a heat map, a bubble chart, an impact chart, and/or a histogram. In some arrangements, the graphical representation is user-interactive such that it can be drilled down on to see the underlying data. In some arrangements, the dashboard further includes a call to action as described relative to 314 of FIG. 3.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers; registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed is:

1. A computing system comprising a processing circuit configured to:
   receive, via a data channel from an agentless monitoring data source, user activity data associated with a first computing device of a first user;
   based on the user activity data, identify anomalous user activity;
   determine a classifier associated with the anomalous user activity;
   based on the classifier, determine a policy violation;
   determine an active directory (AD) identifier of the first user based on a user identifier;
   cross-reference the AD identifier to a human resources database comprising employee-related information;
   compare the employee-related information to a threshold;
   based on the employee-related information exceeding the threshold, adjust a baseline level of risk;
   determine a user score comprising:
      determining a threat dimension based on the policy violation;
      determining an exposure dimension based on the employee-related information; and
      determining an impact dimension based on a predicted scope of an adverse event:
   based on the adjusted baseline level of risk and the user score, determine the probability of the adverse event;
   generate a user-interactive electronic notification comprising an indication of the probability of the adverse event and a subset of the user activity data; and
   transmit the user-interactive electronic notification to a second computing device of a second user.

2. The computing system of claim 1, wherein the agentless monitoring data source is different from the first computing device, and wherein the agentless monitoring data source is a storage array, a network device, a server, or a hypervisor.

3. The computing system of claim 1, wherein the agentless monitoring data source comprises computer-executable code executed from the first computing device, the processing circuit configured to parse the user activity data from the computer-executable code.

4. The computing system of claim 1, wherein the user activity data further comprises data generated by a logging agent executed on the first computing device.

5. The computing system of claim 1, wherein the user activity data comprises use data pertaining to the first computing device.

6. The computing system of claim 1, wherein the user activity data comprises Internet traffic data from the first computing device.

7. The computing system of claim 1, wherein the policy violation comprises at least one of an infiltration characteristic associated with an event indicative of data loss and a flight characteristic associated with an event indicative of a departure.

8. The computing system of claim 7, wherein the employee-related information comprises performance evaluation data associated with the first user.

9. The computing system of claim 7, wherein the employee-related information comprises job role and seniority data associated with the first user.

10. The computing system of claim 1, wherein the data channel is a batch channel and wherein the processing circuit receives the user activity data at predetermined time intervals.

11. The computing system of claim 1, the processing circuit further configured to:
    based on the probability of the adverse event, activate a logging agent on the first computing device.

12. The computing system of claim 1, wherein the data channel is a synchronous channel and wherein the processing circuit receives the user activity data in substantially real-time.

13. The computing system of claim 1, the user-interactive electronic notification comprising a linked training video.

14. A computer-implemented method, the method comprising:
    receiving, via a data channel from an agentless monitoring data source, user activity data associated with a first computing device of a first user;
    based on the user activity data, identifying anomalous user activity;
    determining a classifier associated with the anomalous user activity;
    based on the classifier, determining a policy violation;
    determining an active directory (AD) identifier of the first user based on a user identifier;
    cross-referencing the AD identifier to a human resources database comprising employee-related information;
    comparing the employee-related information to a threshold;
    based on the employee-related information exceeding the threshold, adjusting a baseline level of risk;
    determining a user score comprising:
        determining a threat dimension based on the policy violation;
        determining an exposure dimension based on the employee-related information; and
        determining an impact dimension based on a predicted scope of an adverse event;
    based on the adjusted baseline level of risk and the user score, determining the probability of the adverse event;
    generating a user-interactive electronic notification comprising an indication of the probability of the adverse event and a subset of the user activity data; and
    transmitting the user-interactive electronic notification to a second computing device of a second user.

15. The method of claim 14, wherein the agentless monitoring data source is different from the first computing device, and wherein the agentless monitoring data source is a storage array, a network device, a server, or a hypervisor.

16. The method of claim 14, wherein the user activity data further comprises data generated by a logging agent executed on the first computing device.

17. The method of claim 14, wherein the user activity data comprises at least one of use data pertaining to the first computing device and Internet traffic data from the first computing device.

18. The method of claim 14, wherein the policy violation comprises at least one of an infiltration characteristic associated with an event indicative of data loss and a flight characteristic associated with an event indicative of a departure.

19. The method of claim 18, wherein the employee-related information comprises at least one of performance evaluation data associated with the first user and job role and seniority data associated with the first user, the method further comprising, based on the probability of the adverse event, activating a logging agent on the first computing device.

20. A non-transitory computer-readable medium comprising instructions stored thereon that, when executed by a processor of a computing system, cause the computing system to perform operations comprising:
    receiving, from an agentless monitoring data source, user activity data associated with a first computing device of a first user, wherein the user activity data comprises a user identifier;
    determining an active directory (AD) identifier of the first user based on the user identifier;
    cross-referencing the AD identifier to a human resources database comprising employee-related information;
    compare the employee-related information to a threshold;
    based on the employee-related information exceeding the threshold, adjust a baseline level of risk;
    determine a user score comprising:
        determining a threat dimension based on a policy violation;
        determining an exposure dimension based on the employee-related information; and
        determining an impact dimension based on a predicted scope of an adverse event:
    based on the adjusted baseline level of risk and the user score, determining the probability of the adverse event;
    based on the user identifier, determining the policy violation, the policy violation comprising at least one of an infiltration characteristic associated with an event indicative of data loss and a flight characteristic associated with an event indicative of a departure;
    adjusting the probability of the adverse event based on the at least one of the infiltration characteristic and the flight characteristic;
    when the probability of the adverse event exceeds a predetermined threshold, activating a logging agent on the first computing device;

receiving additional user activity data from the logging agent;

generating a user-interactive electronic notification comprising an indication of the probability of the adverse event, the at least one of the infiltration characteristic and the flight characteristic, a subset of the user activity data, and the additional user activity data; and transmitting the user-interactive electronic notification to a second computing device of a second user.

* * * * *